United States Patent [19]

Randell

[11] 4,298,339
[45] Nov. 3, 1981

[54] METHOD OF HEAT TREATING A MATERIAL

[75] Inventor: Arthur A. Randell, Tewkesbury, England

[73] Assignee: Coal Industry (Patents) Limited, London, England

[21] Appl. No.: 85,412

[22] Filed: Oct. 16, 1979

[30] Foreign Application Priority Data

Nov. 14, 1978 [GB] United Kingdom ............... 44452/78

[51] Int. Cl.³ ............................................. F27B 15/00
[52] U.S. Cl. ..................................... 432/15; 159/48 R
[58] Field of Search .................. 432/15, 14; 159/48 R

[56] References Cited

U.S. PATENT DOCUMENTS

| | | | |
|---|---|---|---|
| 2,714,126 | 7/1955 | Keith | 432/15 |
| 2,977,105 | 3/1961 | Pyzel | 432/15 |
| 3,265,775 | 8/1966 | Friedrich | 432/15 |
| 3,515,381 | 6/1970 | Foch | 432/15 |
| 4,111,158 | 9/1978 | Reh et al. | 432/58 |

FOREIGN PATENT DOCUMENTS 1355031 5/1974 United Kingdom .
1534645 12/1978 United Kingdom .
1544697 4/1979 United Kingdom .

Primary Examiner—John J. Camby
Attorney, Agent, or Firm—Stevens, Davis, Miller & Mosher

[57] ABSTRACT

An improved method of heat treating a slurry material which has combustible and incombustible components includes burning the material in a fluidized bed, to devolatilize the water content and to produce a material which cannot be reslimed. Fine material elutriated from the bed is separated from the entraining gases and is recycled to the center axis of the bed such that upon rising through the bed they encounter and are doused by the incoming spray of slurry material. The fine material so introduced is at a temperature lower than that of the fluidized bed and thus can be used to control the bed temperature by varying the amount of fine material recyled.

5 Claims, 1 Drawing Figure

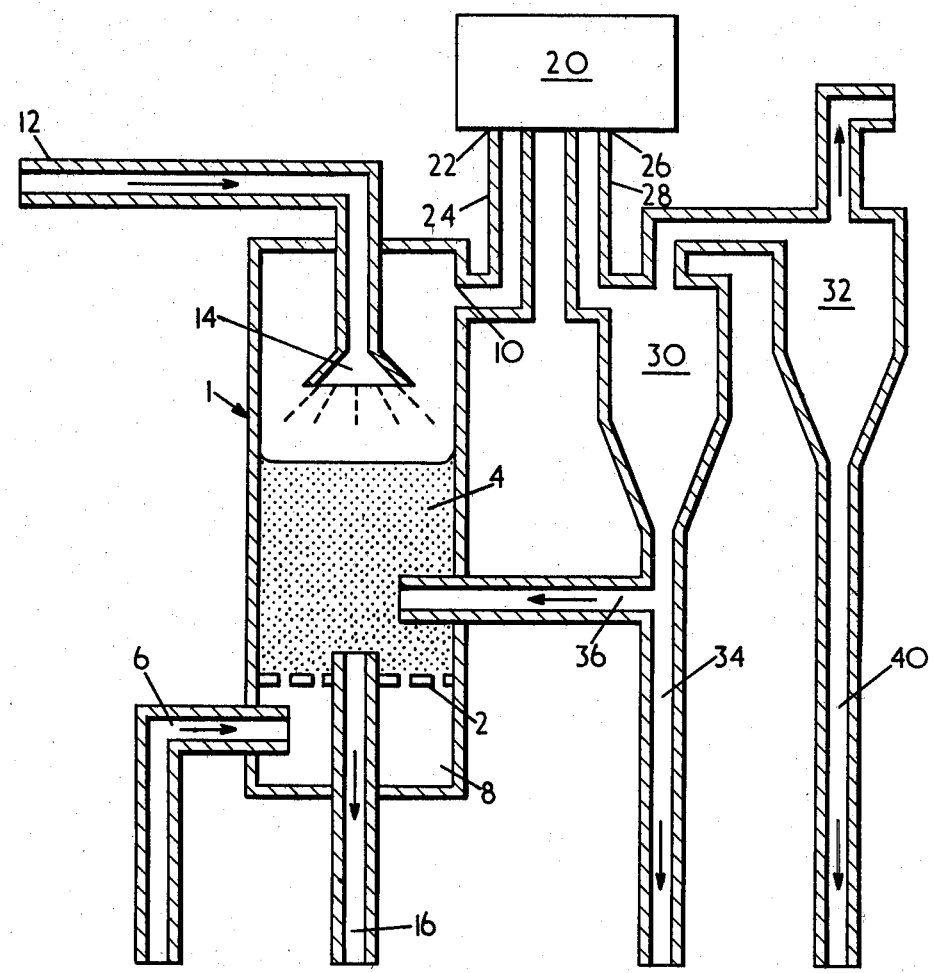

METHOD OF HEAT TREATING A MATERIAL

This invention concerns an improved method of heat treating a material having a water content and combustible and incombustible components.

In particular, the invention has reference to the heat treatment of colliery trailings which leave coal preparation plants in a slurry form, the components of which are water, ash and a combustible content, i.e. carbon, hydrogen, sulphur. The tailings are generally dewatered in thickeners, filter presses or by flocculation in deep cone thickening units. Dewatering of this nature does not alter the character of the solids and as a consequence the subsequent addition of water reconstitutes the tailings which then become unstable. This can have a serious effect if tipping has been employed as a means of disposal and in any event both lagooning and tipping are ecologically undesirable.

Our prior U.K. Specification No. 1,355,031 is directed to a method for the preparation of a low density material from colliery tailings involving the combustion in a fluidised bed of fuel contained in the tailings so as to volatilise the water content thereby causing expansion of the particles of the tailings.

We have also developed an improved method for the thermal treatment of a material having a water content, this method involving the feeding of the material in slurry form having a solids content between 45% and 65% by wt. into a fluidised bed for the combustion of the combustible components. Again the water content is volatilised and the bed is held at a temperature below that at which the solids components sinter. We have also devised a process step involving the recycling of fine material which has been elutriated from the bed and separated in a gas cleaning facility. The reintroduction of this fine material is effected within the bed away from the bounding wall of the combustor. It is also known from GBPS No. 1,534,645 to recycle solids to a fluidised bed in order to vary the temperature of the bed.

It has now been found that the effect of recycling fines can be enhanced by locating the point of introduction in a particular zone of the fluidised bed.

It is therefore an object of the present invention to provide an improved method of thermally treating a material having a water content and combustible and incombustible components.

Accordingly, a method for the thermal treatment of a material having a water content, and combustible and incombustible components includes introducing the material in a slurry form into a fluidised bed whereby combustible components are burnt at least in part and the water content is volatilised, the fluidised bed being maintained at a temperature below that at which the solids components sinter, separating solids material from gases issuing from the fluidised bed, feeding the separated material back into the bed, and reintroducing the separated material at a position located in a central zone of the fluidised bed laterally thereof.

The heat treated material is removed from the bed for subsequent use or processing.

The temperature at which combustion takes place lies in the range 800° C. to 1000° C.

The material fed to the bed for thermal treatment preferably has a solids content of between 45% and 65% by wt. As long as the material is pumpable, it is envisaged that there should be few problems in generating a spray. A spray head suitable for this method is disclosed in our co-pending U.K. Pat. No. 1,544,697.

The material is preferably sprayed onto the fluidised bed and thus the disposition of the reintroduction point in the central zone of the bed taken laterally, tends to secure that the fine solids material separated from the gases is subject to a dowsing action of the spray as it rises through the bed. The fine particles are thus suppressed by the incoming spray and agglomeration by coating of the individual particles thus serves to ensure that the particles are retained within the bed.

Furthermore, the superficial velocity of the fluidising gas, e.g. air, is substantially constant throughout the bed and thus the elutriation is not influenced by the rate at which the material is fed to the bed nor by the evaporation of water which takes place in the freeboard or at the top of the bed.

Since the spray of material has the effect of reducing elutriation from the fluidised bed, the carbon loss is minimised and thus most of the combustion takes place in the bed. The temperature of the freeboard, i.e. the space above the fluidised bed, is lower than would otherwise be the case. This gives rise to the possibility of heat recovery prior to separation and accordingly the invention also includes the steps of passing the combustion gases issuing from the fluidised bed directly to a heat recuperative system, extracting heat from the gases and entrained solids material to reduce the temperature thereof, and passing the gases subsequently to separating means for separating the solids material entrained in the gases.

The heat recuperative system may incorporate a steam or hot water generating unit or may be employed to preheat the air required for fluidising the bed in which the material is thermally treated.

Since the temperature of the gases leaving the heat recuperative system is much lower than that of the entry gases, for example 300° C. compared to 850° C., the size of the separating means, for example cyclone separators, can be reduced as the gas volume is smaller and the material from which they are made can be relatively cheap. Furthermore, the problems of clogging usually attendant upon the operation of cyclones at high temperatures are reduced considerably thereby enabling a more efficient and smooth running process to be achieved. The temperature of gases leaving the heat recuperative unit may be at any desired level.

The particles so separated are, as hereinbefore stated, recycled to the bed and it will be appreciated that the temperature of the particles will be less than that of the bed. A further aspect of the invention is concerned with the usage of the relatively cooler particles to control the temperature of the fluidised combustion bed.

Accordingly the further aspect includes the steps of returning the separated material to the fluidised bed, and varying the rate at which the material is returned in order to control the temperature of the fluidised bed.

The temperature of the bed may alternatively or in combination be varied by a variation in the temperature of the fluidising air.

The cooler recycled material dissipates the excess heat being generated and thus controls the bed temperature. For a given material a state of equilibrium conditions will eventually exist, that is to say for a material of a given calorific value which usually remains reasonably constant, the recycle rate of separated material in order to maintain the appropriate bed temperature will stay at a substantially constant level. Any slight variation in bed temperature can be controlled, therefore, by varying the temperature of the fluidising air. If the calorific value of the input material should change significantly, however, the temperature change will advantageously be controlled by varying the rate of material recycle to the fluidised bed; a variation in temperature of the fluidising air may be employed in combination.

This new step enables integral control to be realised and overcomes at least some of the disadvantages associated with other techniques used for temperature control. For example, one method of temperature control involves varying the input of material: clearly if this input is reduced, then the throughput is correspondingly reduced. Alternatively water may be added to quench combustion, but this requires special injection equipment and the formation of more steam can be disadvantageous. As a further example, heat exchange tubing can be located in the bed but this necessarily adds to the cost since circulation equipment would normally be necessary.

This further aspect, therefore, provides the opportunity for inherent control of the bed temperature whilst also achieving a high solids retention rate in the fluidised bed by the reintroduction of the solids material at the centre zone of the bed. The retention is envisaged as being at least 65% and in some instances 80% or higher.

A still further step of the present invention includes removing the heat treated material from the fluidised bed, cooling the material, reintroducing at least part of the cooled material to the bed, and varying the amount of cooled material so introduced in accordance with the desired temperature level in the fluidised bed.

The FIGURE of drawings is an arrangement of the fluidized bed structure.

By way of example only, a method for the thermal treatment of a slurry material according to the invention is described below with reference to the accompanying drawing which is a flow diagram showing the steps involved in the method.

Referring to the drawing, there is shown a fluidised bed apparatus 1 provided with a gas permeable support plate 2 on which is formed a bed 4 of particulate material. An air supply pipe 6 extends into a plenum 8 defined beneath the plate 2 and an exhaust gas outlet 10 is situated at some distance above the plate 2.

A material supply conduit 12 extends into the apparatus 1 and terminates in a spray head 14. A discharge pipe 16 for treated material is disposed in the apparatus 1 and extends outwardly through the plate 2 and plenum 8 to terminate outside the apparatus.

A heat recuperator 20 is provided and has its inlet 22 connected via a conduit 24 to the exhaust gas outlet 10. An outlet 26 communicates via a pipe 28 with a cyclone separator 30, the gas outlet of which is connected to a further cyclone separator 32. The material outlet pipe 34 of separator 30 has teed into it a conduit 36 which extends into the apparatus 1 and penetrates the bed 4 to a central location laterally of the bed, beneath the spray head 14.

In operation of the apparatus 1, slurry material enters the apparatus through conduit 12 and is sprayed via the spray head 14 onto the hot fluidised bed 4 maintained at a temperature of between 800° C. and 1000° C. thereby to burn the combustible content of the material. It is a characteristic of fluidised beds that fine particles are elutriated and the exhaust gases together with any entrained material are passed to the separator 30. However, the gases first flow to the heat recuperator 20 wherein cooling takes place, thereafter the gases being led to the separator 30 which because of the lower temperature, can be smaller in size and of cheaper construction materials compared with cyclones coupled directly to the exhaust.

At least some of the cooled material separated is passed through conduit 36 into the fluidised bed 4 and thereby assists in controlling the bed temperature. The amount of cooled material in this way depends on the desired temperature level and can be raised accordingly. Any cooled material not employed in this way is discharged through pipe 34. Likewise, material separated in separator 32 passes out of the system through a leg 40.

Fine material injected into the bed 4 in this way, directly beneath the incoming spray are suppressed and thus the particle loading in the freeboard is reduced.

I claim:

1. A method for the thermal treatment of a slurry material having combustible and incombustible components, including the steps of spraying the material onto a fluidised bed, burning the combustible components at least in part in the fluidised bed, the water being volatilised, maintaining the fluidised bed at a temperature below that at which the solids components sinter, separating solids material from gases issuing from the fluidised bed, feeding the separated material back into the bed, and reintroducing the separated material at a position located in a central zone of the fluidised bed laterally thereof beneath the incoming spray thereby to suppress at least some material elutriated from the bed.

2. A method according to claim 1 in which the material fed to the bed for thermal treatment has a solids content of between 45% and 65% by wt.

3. A method according to claim 1 in which heat is recuperated from the gases issuing from the fluidised bed, whereby the temperature of the gases is reduced.

4. A method according to claim 3 in which the solids material in the gases is separated from the gases after the temperature thereof has been reduced.

5. A method according to claim 4 in which material separated from the gases is fed into the fluidised bed at a rate dependent upon the temperature of the bed.

* * * * *